US010510025B2

(12) United States Patent
Zoldi et al.

(10) Patent No.: US 10,510,025 B2
(45) Date of Patent: Dec. 17, 2019

(54) ADAPTIVE FRAUD DETECTION

(75) Inventors: Scott M. Zoldi, San Diego, CA (US);
Larry Peranich, San Diego, CA (US);
Jehangir Athwal, San Diego, CA (US);
Uwe Mayer, Encinitas, CA (US);
Sajama, Jersey City, NJ (US)

(73) Assignee: FAIR ISAAC CORPORATION,
Roseville, MN (US)

( * ) Notice: Subject to any disclaimer, the term of this patent is extended or adjusted under 35 U.S.C. 154(b) by 2097 days.

(21) Appl. No.: 12/040,796

(22) Filed: Feb. 29, 2008

(65) Prior Publication Data

US 2009/0222243 A1 Sep. 3, 2009

(51) Int. Cl.
*G06Q 10/04* (2012.01)
*G06Q 10/06* (2012.01)

(52) U.S. Cl.
CPC ......... *G06Q 10/04* (2013.01); *G06Q 10/0635* (2013.01)

(58) Field of Classification Search
CPC ............................ G06Q 10/04; G06Q 10/0635
USPC .................................. 705/7, 14.47, 318, 325
See application file for complete search history.

(56) References Cited

U.S. PATENT DOCUMENTS

| 6,163,604 | A  | * | 12/2000 | Baulier et al. ................ 379/189 |
|-----------|-----|---|---------|---------------------------------|
| 7,376,618 | B1 | * | 5/2008  | Anderson et al. ............... 705/38 |
| 7,865,427 | B2 | * | 1/2011  | Wright et al. .................. 705/38 |
| 2007/0198362 | A1 | * | 8/2007 | Ronning et al. ................ 705/26 |
| 2008/0077515 | A1 | * | 3/2008 | Zoldi et al. ..................... 705/35 |
| 2008/0140576 | A1 | * | 6/2008 | Lewis et al. .................... 705/67 |
| 2008/0275748 | A1 | * | 11/2008 | John .............................. 705/7 |
| 2009/0076870 | A1 | * | 3/2009 | Hammond et al. ............... 705/7 |
| 2009/0234683 | A1 | * | 9/2009 | Anderson et al. ................ 705/7 |

\* cited by examiner

*Primary Examiner* — Florian M Zeender
*Assistant Examiner* — Christopher R Buchanan
(74) *Attorney, Agent, or Firm* — Mintz Levin Cohn Ferris Glovsky and Popeo, P.C.; F. Jason Far-hadian, Esq.

(57) ABSTRACT

A computer-implemented method includes receiving a new data record associated with a transaction, and generating, using an adaptive model executed by the computer, a score to represent a likelihood that the transaction is associated with fraud. The adaptive model employs feedback from one or more external data sources, the feedback containing information about one or more previous data records associated with fraud and non-fraud by at least one of the one or more external data sources. Further, the adaptive model uses the information about the one or more previous data records as input variables to update scoring parameters used to generate the score for the new data record.

22 Claims, 8 Drawing Sheets

ADAPTIVE FRAUD DETECTION

BACKGROUND

This disclosure relates generally to a computer-based, real-time adaptive system for fraud detection implementing automatic binning, feature selection, adaptive statistical models, and score blending.

Statistical models generally provide superior fraud detection as compared to (expert) rules systems. Traditional statistical models, in a simplified sense, extract patterns from historical data and use these patterns on future data to aide decisions. The premise behind an adaptive model for fraud detection is that changes in fraud patterns which a traditional static statistical model could not foresee are compensated for by the adaptive nature of the model. As such, it is intended for situations where traditional models might prove suboptimal. Typical such situations are:

Little or no historic data is available.

The historic data is known not to or expected not to match production data well.

The historic data had only a subset of the features available that will be available in production.

The historic data used to build the traditional statistical model was based on pooled data contributions from several data contributors and the production data available after deployment is expected to not match the pooled data contributions.

SUMMARY

In general, this document discusses a computer-based system and method for real-time, adaptive fraud detection, and which implement automatic binning, automatic feature selection, adaptive statistical models, and adaptive score blending.

In one aspect, a computer-implemented method includes receiving a new data record associated with a transaction, and generating, using an adaptive model executed by the computer, a score to represent a likelihood that the transaction is associated with fraud. The adaptive model employs feedback from one or more external data sources, the feedback containing information about one or more previous data records associated with fraud and non-fraud by at least one of the one or more external data sources. Further, the adaptive model uses the information about the one or more previous data records as input variables to update scoring parameters used to generate the score for the new data record.

In other aspects, a computer program product is provided which is configured to execute the method as summarized above. In yet other aspects, a system having at least one computer connected to a network is provided to execute the method as summarized above. The details of one or more aspects and implementations are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a computer-based, real-time adaptive system and method for fraud detection, implementing automatic binning, automatic feature selection, adaptive statistical models, and adaptive score blending.

Cascade Architecture

In accordance with a preferred implementation, an adaptive model is cascaded after a static (non-adaptive) base model. The model is adaptive since its parameters automatically change over time in response to changes in labeled fraud and non-fraud data records. For development and testing of this system, the base model is a traditional statistical model. The system has been successfully tested on a transactional model which is used for detection of credit card fraud, on a model in the credit card origination space, and on a model in the telecommunications space. However the model design and architecture are not limited to these applications, but rather apply to any model. The term "cascade" indicates that the adaptive model processes data after the base model. The intention is for the adaptive model to use the base model's input variables, and potentially some additional input variables capturing data not used by the base model, and adjust the base model's score to reflect changes in the fraud and non-fraud statistics. Also, the adaptive model scores only those data records which are determined to be fraud-like by the base model. This enables the adaptive model to focus on detecting fraud in a risky subpopulation rather than having to consider every type of account including the much larger not risky population.

Figure 1:
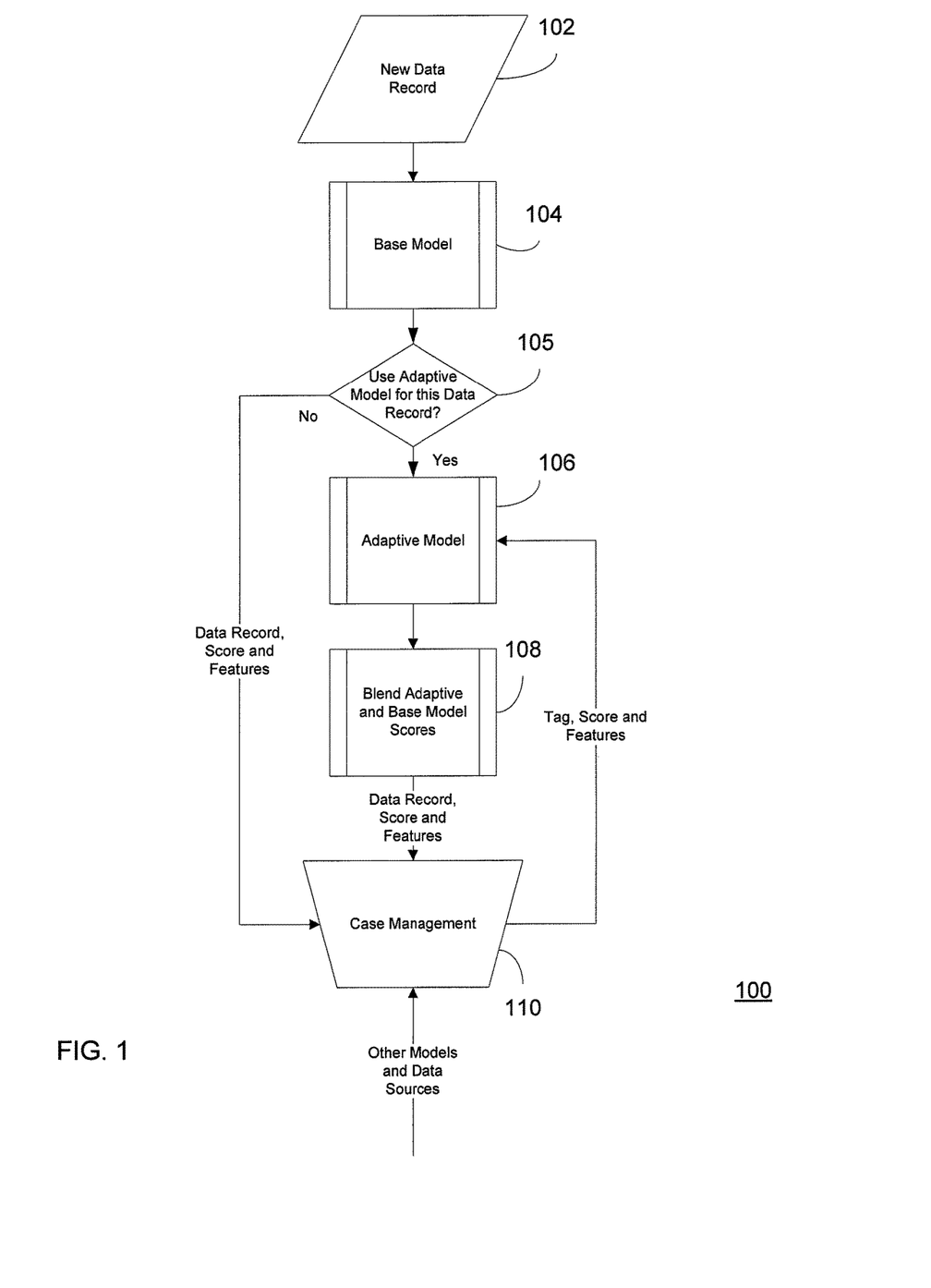
FIG. 1 shows a flow 100 of data records in the cascade model configuration.

FIG. 1 shows a flow 100 of data records in the cascade model configuration. First, a new data record 102 (e.g., a credit card transaction) to be evaluated for its likelihood of fraud comes into the system. This record is evaluated (scored) by a base model 104, and the score value and base model features are added to the data record. If the score from the base model indicates a high likelihood of fraud, the record is passed to an adaptive model 106 which also computes a score. If however the likelihood of fraud is low then the output of the base model 104 bypasses the adaptive model 106. If the likelihood of fraud is high, then the score from the adaptive model 106 is blended (mathematically combined) with the score from the base model 104 to produce a blended score 108, a single, more powerful score that is better able to predict the likelihood of fraud than either of the prior two scores.

The input data record and the blended score 108 are passed to a case management system 110 where human fraud experts determine whether the record is actually a fraudulent record or a non-fraudulent record. The case management system 110 allows the fraud expert to access other data sources including communicating with the legitimate person who is authorized to conduct the transaction (e.g., the credit card holder). Following the determination whether the record is fraudulent, a fraud tag (binary variable with value 0 indicating non-fraud and value 1 indicating fraud) is added to the data record and it is passed back to the adaptive model 106 so that the adaptive model can update its parameters to more accurately detect the latest fraud trends.

Adaptive Model

At least three types of adaptive models are suitable for use: Probabilistic Neural Networks (PNN), Naïve Bayesian (NB) and k-Nearest Neighbors (kNN). These models are made adaptive by continuously updating fraud and non-fraud first-in-first-out (FIFO) queues (also referred to as fraud and non-fraud tables) from which model parameters are calculated. The FIFO queues are populated with data records labeled by a fraud analyst. The usage of the labeled data records creates a feedback loop.

All of these model types receive the same two input data streams: the feedback records which have a fraud tag that specifies whether these records are fraudulent or non-fraudulent, and a stream of new records for each of which the model is to produce a score that indicates the probability of fraud. The feedback records are added to the fraud and non-fraud tables and certain (other) model parameters are updated to reflect the statistics of the records in the fraud and non-fraud tables. These model parameters can include the prior probabilities (the priors), which are the overall probability of a record being fraud and the overall probability of a record being non-fraud in the feedback data.

The manner in which the model computes the score is different for the kNN model than it is for the PNN and Naïve Bayesian models. The following sections detail the fraud and non-fraud tables and model differences.

Fraud and Non-Fraud Tables

Each model, as implemented by a unique algorithm, keeps a history of the most recent records from the feedback loop or a subset thereof, with these records kept in first-in, first-out (FIFO) tables. Minimally, there are at least two such tables, one for the non-fraud records (the non-fraud table), and one for the fraud records (the fraud table). If the fraud records are tracked by fraud type, then multiple fraud record tables will exist, one per fraud type T (the fraud table for type T). Records are entered into the appropriate tables after their fraud classification is known after case review. By having multiple fraud tables, multiple improved fraud scores can be created based on how similar the current transaction and its corresponding fraud feature variables are to the fraud records of each class.

Once the tables are full, the insertion of a new record forces the oldest record in the corresponding table to be removed (FIFO). In case of the Naïve Bayes classifier, separate frequency tables are also maintained and updated for each feature with the counts of records having values in the individual bins. These count tables can be used to speed up computations significantly, as they avoid a full fraud and non-fraud table processing during scoring.

Structure of PNN and Naïve Bayesian Models

Figure 2:
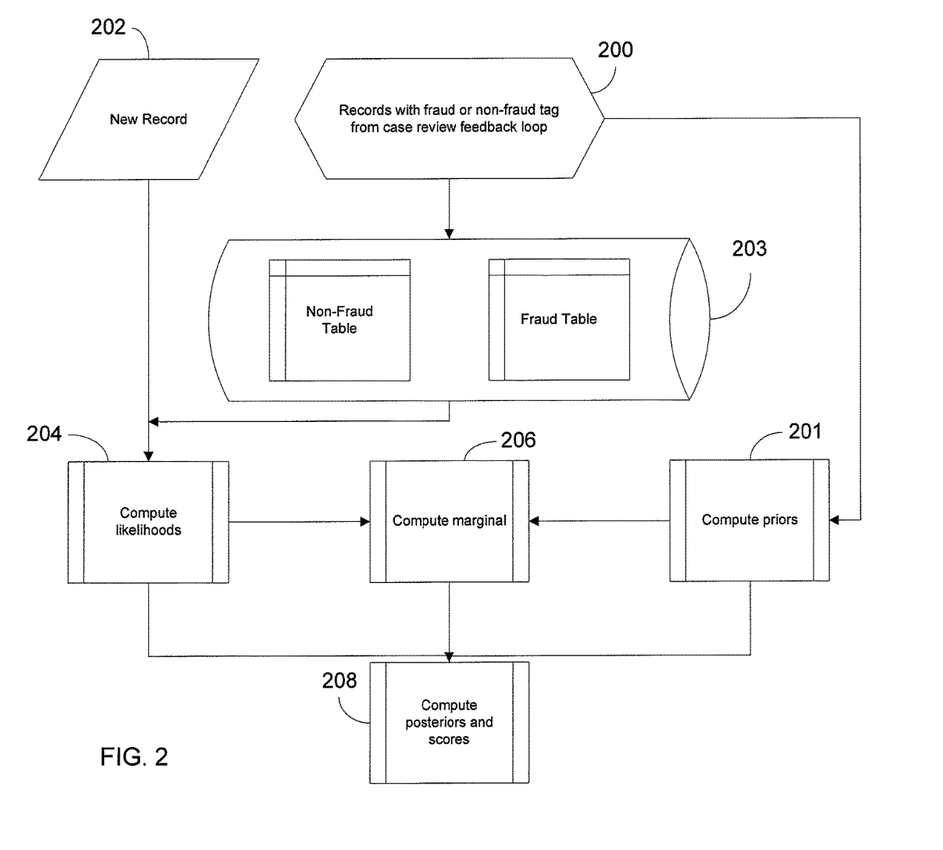
FIG. 2 shows the structure of PNN and Naïve Bayesian adaptive fraud detection models.

FIG. 2 shows the structure of the PNN and Naïve Bayesian models. As described above, the feedback records 200 or a subset of them are put into the fraud tables and non-fraud tables 203 and are used to compute the prior probabilities (step 201).

New records 202 (the records to be scored) are presented to the model and the model computes the likelihoods of the input data values given that the record is fraudulent and given that the record is non-fraudulent (step 204). These likelihoods are combined with the prior probabilities to calculate the marginal probabilities of the input data (step 206). Finally, the probabilities are combined via Bayes formula (Equation 1: Bayes Equation) to compute the posterior probability (step 208). The posterior or some value monotonically related to the posterior becomes the output score.

$$P(\text{fraud} \mid X) = \frac{P(X \mid \text{fraud})P(\text{fraud})}{P(X)} \quad \text{(Eq. 1)}$$

$$\text{posterior} = \frac{\text{likelihood} \times \text{fraud prior}}{\text{record marginal}} \quad \text{(Eq. 2)}$$

Structure of the kNN Model

Figure 3:
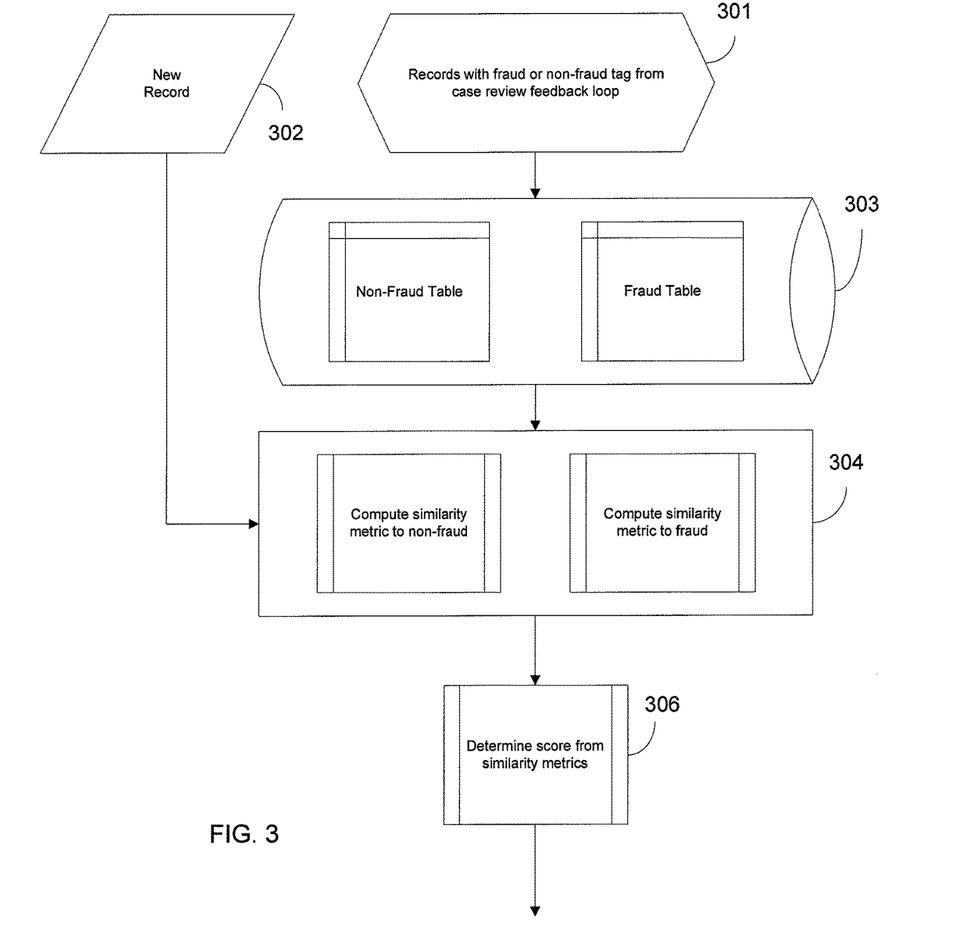
FIG. 3 shows the structure of the kNN adaptive fraud detection model.

FIG. 3 shows the structure of the kNN model. This model receives the feedback records (301) and places them or a subset of them into the fraud and non-fraud tables 303. However, this model does not compute any probabilities based upon the feedback records.

The new records 302 are presented to the model, and the model computes a similarity between each new record and the records in the fraud and non-fraud tables (step 304). The more similar the new record is to the records in the fraud table, and the less similar the new record is to the records in the non-fraud table, the higher the probability that the new record is fraudulent.

In one exemplary implementation, a scaled distance metric is used to determine similarity of the new record with fraud and non-fraud records (step 306). The first step is to z-scale each of the variables, which consist of subtracting each variable's mean from its value and then dividing the result by the variable's standard deviation. Next, the scaled Euclidian distances from the new record to every record in the fraud and non-fraud tables is computed. Typically kNN is used only for classification and produces a categorical output. The predicted category is the one with the most members in the nearest k records. To produce a real valued score, the average of the closest k fraud distances is subtracted from the average of the closed k non-fraud distances. This difference is used to produce the output score.

Automation

Additional constraints placed on the adaptive model are the minimization of the number of the user defined parameters and computational complexity. Ideally the adaptive model configures itself automatically. These constraints required the implementation of variable binning (i.e. creating a discrete variable from one that is continuous), scaling of variables, variable selection and a method of blending the base and adaptive model scores.

Binning

The implemented adaptive model may require all input features to be categorical. However, actual input data often consists of numeric features, most of which are continuously distributed. Thus, each non-categorical input feature must be binned to convert it from a continuous feature to a categorical feature. The system may either use pre-defined bins, or may be configured to determine the bin boundaries adaptively during a startup routine. Bins may be defined so that there are separate bins for special values (such as a feature that takes specific fixed values for sizeable proportions of the records). FIG. 5 depicts an exemplary binning technique in which the bin widths are equal, for determining bin edges according to step 410 in FIG. 4. Often domain expertise, or the existence of historical data that allows representative statistics to be computed, allows the system to be configured with predefined bin boundaries. The system allows reading in these bin definitions as part of the configuration. A fully adaptive system can also have an adaptive binning capability, instead of having the user transform continuous input features into categorical features. This binning could occur either during the startup routine, or be ongoing adaptively.

Binning Configuration Using a Startup Routine

Figure 4:
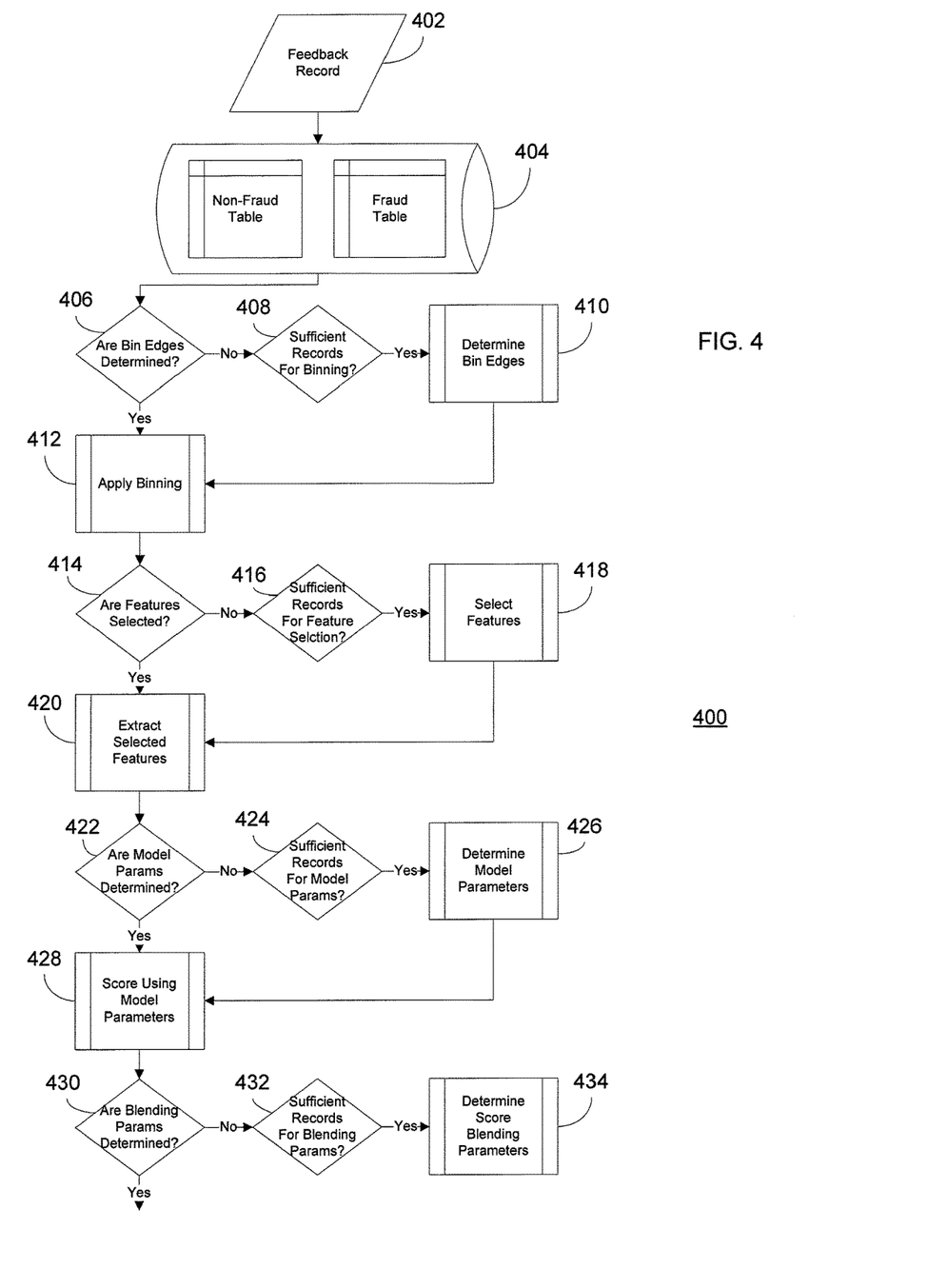
FIG. 4 illustrates a startup routine 400 for an adaptive model.
Figure 5:
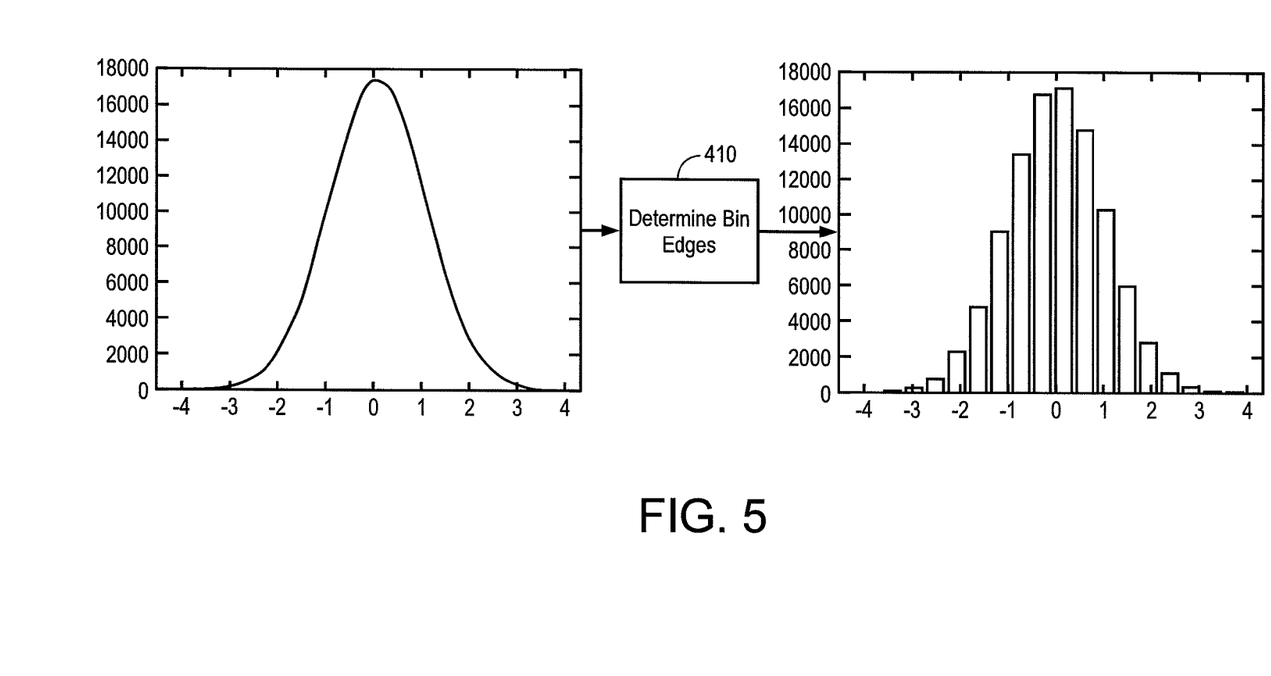
FIG. 5 depicts an exemplary binning technique.

FIG. 4 illustrates a startup routine 400 that includes data pre-processing, model building and calculation of score blending parameters, and which can be implemented as a method or as functional software modules. During the startup routine 400, the system does not compute a score using the adaptive model, but collects the feedback records at 402, which are queued in first-in, first-out (FIFO) tables, one for the non-fraud records (the non-fraud table), and one for the fraud records (the fraud table) at 404. Record collection may be limited to only those records satisfying a rule, such as exceeding a base model score threshold. At 406, the system determines whether bin edges, or "boundaries," are determined. If yes, at 412 binning is applied to the records. If no, at 408 the system determines whether there are sufficient number of records for binning. If a sufficient number of records has not been collected, the system will continue to queue the feedback records received at 402. After a sufficient number of records have been collected, the collection can be used feature-by-feature to determine the quantiles, for example, and to compute bin boundaries (equal-population binning) at 410, which are applied at 412. Other binning mechanisms, such as equal range bins, or a combination of the two can also be implemented.

The computation of the binning boundaries will take a certain amount of computations, during which normal processing is halted. If this is acceptable, then additional incoming records can be queued, and scored later. If this is not acceptable, then the computations can be farmed out to a second process, and the passing through of the records can continue in real-time. The passed-through records, like the initial startup records, will not get scored by the adaptive model during the start-up phase.

The startup phase configuration hence results in a phase in which data is collected for binning, and no scores are produced. Then in a one-time event the binning boundaries are computed, and from there on the binning is fixed. The same records that are used to determine the bin boundaries can be used to start filling the fraud and non-fraud tables if these records are feedback records that contain the fraud/non-fraud tag.

Binning Configuration Using Adaptive Ongoing Binning

In a variation, the system is configured to use a quantile estimator suitable for streaming data. Bin boundaries are determined and updated with each record. Accordingly, the binning boundaries are not fixed, but continue to adapt to the data. The value of any given feature of any given record may hence fall into a different bin, depending on when in the lifespan of the data processing the binning occurs. Once sufficient records have been processed and thus sufficient statistics are collected, the quantile estimation will become stable, and this effect will diminish. If there is changes in the underlying distribution of the variables over time the bin boundaries can be configured to adaptively adjust.

Feature Selection

The incoming data stream might have more features (variables) than is desirable for the effectiveness and stability of the adaptive model. The system hence is configurable to handle a reduction in the feature set. An advantage of feature selection is that only the selected features must be stored, and the memory footprint can be reduced. For ease of implementation and data collection purposes one may also continue to store all features, and only use the selected subset of features for scoring. Further as shown in FIG. 4, at 414 the system determines whether features are selected. If yes, the feature selection is applied, as described further below. If no, at 416 the system determines whether there are sufficient records for feature selection. If there are a sufficient number of records, at 418, the features are selected and at 420 the outcome of the feature selection is applied.

Often domain expertise, or the existence of historical data allows representative statistics to be computed, allows the system to be configured with a predefined subset of the input features. This includes the case when there is no feature selection needed or desired. The system allows reading in of the feature subset definition as part of the configuration. Scoring may commence as soon as the binning boundaries are set, and the fraud and non-fraud tables are sufficiently filled.

Principally both supervised and unsupervised feature selections may be implemented. Supervised feature selection uses the fraud tag in the feedback data as part of the calculation, while unsupervised feature selection uses only the statistics of the input data. Because one of the main components of the adaptive model is a feedback loop and because supervised feature selection methods generally achieve superior results, supervised methods are preferred. Supervised feature selection is feasible for the system because the system is already storing the most recent feedback records in the fraud and non-fraud tables at 404.

The feature selection algorithm is based on a "merit value" for a candidate feature given a set of previously selected features, where the merit value is based upon the theory of mutual information. The merit value for a candidate feature depends upon the mutual information of the candidate feature, a subset of previously selected features and the target. The merit value for each candidate feature is computed, and the candidate feature with the largest merit value is added to the set of selected features. The first feature is selected based upon its mutual information with the fraud tag. This iterates until a user-specified number of features have been selected or the merit value reaches a pre-defined minimum.

The computation of the mutual information requires categorical features, so the candidate features must be binned. Bins have already been computed for each input feature before the feature selection is initialized, but these bin definitions may contain up to twenty or more bins for each feature. The proposed number of records used in the calculation may typically be on the order of one thousand, so twenty bins would not be too many and would still allow for statistical significance in the calculation of mutual information of each individual feature with a binary target. However, the merit value calculation requires the calculation of mutual information between a hybrid feature and the fraud tag. The hybrid feature is a categorical feature composed of all possible combinations of the bins of two separate features, which has about 400 bins if the individual variables have 20 bins each. The statistics for the selection for the hybrid variables become too uncertain for the desired number of records and number of bins of the features; hence the features are temporarily re-binned into coarser bins to reduce the number of bins for the purpose of feature selection.

Another feature selection algorithm may be based on a k-Nearest Neighbors algorithm of the features, with the distance being an inverse of the squared correlation between the features. The number of clusters #C is user-specified, and so is the desired number of selected features #F (where #F should be less than #C). The clusters are ranked by the highest correlation of one of their member features with the target feature, and the system then chooses the highest-correlated member feature of each of the #F highest-correlated clusters. Any computer memory used for clustering can be discarded after the feature selection is complete.

Returning to the startup routine 400 as shown in FIG. 4, at 422 the system determines whether model parameters have been determined. If yes, a score is generated using the determined model parameters, as described further below. If no, at 424 the system determines whether there are sufficient records for determining model parameters. If there are a sufficient number of records, at 426, the model parameters are determined and at 428 the score is generated using the determined model parameters, as described below. At 430, the system determines whether score blending parameters are determined. If yes, then a scored blending algorithm is applied, as described below. If not, at 432 the system determines whether there are sufficient records for determining blending parameters, and if yes, at 434 the score blending parameters are determined.

Score Blending

If the adaptive model is deployed in combination with a base model, then after the system has computed the adaptive model score, the user finds himself with two scores instead of one. The following basic configurations are possible: (i) use only the adaptive model score, or (ii) produce a blended score of the two models. Approach (ii) is generally better, since it incorporates the discriminating power of both scores.

Any number of score blending algorithms are possible. These include: a simple average of the two scores, using a linear or logistic regression model to determine the score blending, or binning both scores and determining the probability of fraud in every cell in the 2-dimensional table containing all possible combinations of the bins on the two scores. However, certain business and analytic constraints make all of these sub-optimal. The simple average is not optimal if the two scores have differing statistical strengths, the regression models are complex to implement. While it does not take much time to execute, it may take significantly more time to train, and the dual binning approach takes smooth scores and changes them into discrete values that are potentially statistically noisy and therefore of less use. The score distribution of the adaptive model can also change significantly as the fraud table and non-fraud table fill during startup, so an adaptive blending algorithm is desirable.

In addition, if the base model is already installed at a customer site, and the customer has defined business rules based upon the output score from that model, those rules will be expecting the range of the blended score to be the same as the range of the base model score. The customer will also desire the probability of fraud given a particular blended score value to be approximately the same as the probability of fraud given the same value of the base model score.

These constraints lead to score blending, which includes the following features: 1) The blended score has the same score range as the base model's score; 2) The probability of fraud given a particular blended score value is approximately the same as the probability of fraud given the same base model score; 3) The base model score is not binned, but is added linearly into the blended score, maintaining the fine grain discrimination of the original base score; 4) The algorithm is easy to implement and executes quickly; and 5) The algorithm adapts as the adaptive model's score distribution changes.

The result of a selected blending algorithm can include a set of quantile-based bins for the adaptive model score, and for each bin, an offset that gets added to the base model score. The offsets will be positive for higher adaptive model scores and negative for lower adaptive model scores. The offsets are guaranteed to be monotonically increasing with adaptive model score. In order to prevent the blended score from exceeding the value the maximum base model score, for records with base model scores above 90% of the maximum score, positive offsets are multiplied by a factor that decreases as the base model score gets closer to its maximum.

The score blending algorithm is adaptive in that it updates its parameter estimates based on the latest data records. Since the updating of these parameters requires the fraud tag, only records from the feedback loop are used to perform the updates.

The first part of the blending algorithm is to construct a one-input-variable linear regression model that predicts the fraud tag given the base model score. The actual fraud tag is a binary value equal to 0 for non-frauds and 1 for frauds, while the output of this linear regression model is a continuously distributed value $\theta = m \times F + b$ where m is the slope parameter of the linear regression model, F is the base model score, and b is the intercept parameter of the linear regression model. The values of m and b are updated periodically.

The second part of the blending algorithm is to construct quantile-based bins of the adaptive model score. The quantile estimates are updated after every 1000th score computed by the adaptive model. Since these quantile estimates do not depend upon the fraud tag, they use every record scored by the adaptive model. The bin boundaries are selected to produce about 10 approximately equal population bins. The bin boundaries are updated as follows: the quantiles for the latest 1000 records are computed by sorting the corresponding 1000 adaptive model scores and finding the values in the sort list that correspond to the quantiles, and this estimate of the quantiles is averaged with the prior estimates using a decay formula that weights the most recent estimates more strongly than the oldest estimates.

The final part of the blending algorithm is to compute the offset for each bin of the adaptive model score, with the offsets to be added to the base model score to produce the blended score. The offsets are computed by: (1) for each adaptive model score bin, compute the average error in the linear regression model described above, (2) scale the average error by multiplying by 1/nm (which converts the offsets from the 0 to 1 range of the fraud tag to the range of the base score), and (3) enforce monotonicity of the offsets with respect to the adaptive model score by applying a variation of the well known "pool adjacent violators" algorithm.

Figure 6:
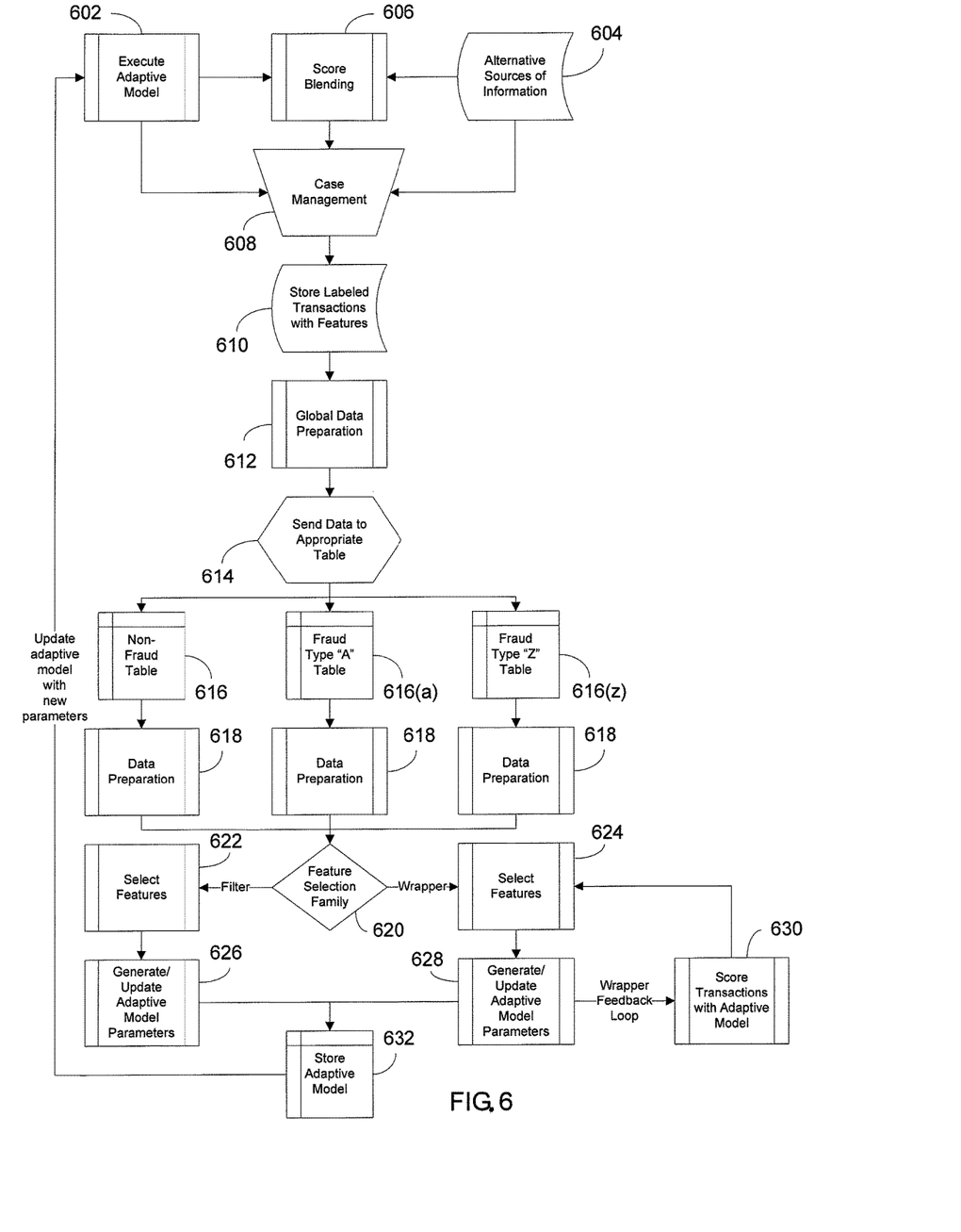
FIG. 6 illustrates a process for distinguishing among several types of frauds.

The steps involved in the adaptive cascade model can be extended in many ways and are discussed in the following sections. FIG. 6 illustrates a process for distinguishing several types of frauds.

The starting point is the receiving of a tagged record. Instead of processing one record at a time, an option is to process data in batches in which more than one record is stored before proceeding to the next step. Subsequent steps will then process an array of records. Also, some steps can be scheduled to run after accumulating different numbers of records. For example, the binning could be updated every 1000 records and feature selection could occur every 10,000 records. In an exemplary system, the adaptive model is executed at 602 to generate a score with alternate sources of information 604, based on score blending 606 as described above. The blended score from 606, as well as adaptive model results from 602 and alternative sources of information from 604, are managed by a case management module

608, which is adapted to store labeled transactions with features at 610 and categorize each record to distribute to the appropriate tables. For batch processing, more than one record can be collected before proceeding to the next functional module. The architecture can be modified for sequential updates.

The next step is the Global Data Preparation 612 which involves using the entire record population for the collection of statistics, z-scaling, binning or new variable generation. For example, the mean and standard deviation statistics can be collected for each feature, and then z-scaled features in the current batch and subsequent records can be generated. Once the data has been processed on a global level, the data is segmented at 614 into various categories and stored in separate tables 616 for further collection of statistics, data processing or variable generation. The tables 616 could be fraud and non-fraud and used together to produce a single model or further divided into categories like fraud and non-fraud for high credit limit account (i.e. fraud type "A" 616(*a*)) and fraud and non-fraud for low credit limit accounts (i.e. fraud type "Z" 616(*b*)). Other fraud categories can be used.

Data preparation modules 618 prepare the data with features with discrete values or parameterized distributions. As such, bin edges and/or distribution parameters can be calculated for each feature in each data segment. Parameters from a global Data Preparation Module can be used, if necessary. Once data for the various groups has been collected and prepared by data preparation modules 618, feature selection can begin. Feature selection is typically done for each adaptive model. Additionally, the data can be divided into training and validation sets which are useful for wrapper feature selection methods as well as preventing over-training for models which require iterative training.

To continue the example with the hypothetical split of the accounts along their credit limit mentioned above, one model would be created to score fraud for high credit limits and one model for low credit limits. Each undergoes its own feature selection. Other classification and regression problems can be addressed using the same methodology, such as, for example, accepting a marketing solicitation.

Two families of feature selection 620 are the filter feature selection 622 and wrapper feature selection 624. Wrapper feature selection 624 uses metrics based on the model output to determine which features lead to the best model performance. Filter feature selection 622 uses statistical measures that are separate from model output to select features (the method described in this document is a filter feature selection). Once the features have been selected the model parameters can be determined at modules 626 and 628, respectively, and then stored at module 632 for when the model is executed. The model parameters from the wrapper feature selection 624 are provided to a module 630 to score transactions with the adaptive module, which is fed back to the wrapper feature selection 624.

The dependent variable (i.e. target) does not have to be limited to fraud. Other classification and regression problems can be addressed using the same methodology, such as for example accepting a marketing solicitation.

This system performs a binary classification by labeling a data record as either fraud or non-fraud. By using FIFO queues for various fraud types, the adaptive model would produce a score and identify which type of fraud is more likely. The additional segmentation of fraud may improve overall model performance. Additional categories such as high or low credit limit could also be added to further segment the data. With segmentation along the fraud type one would obtain one score per fraud type, introducing a slightly more involved score blending. Multiple base and/or adaptive models could be used.

Figure 7:
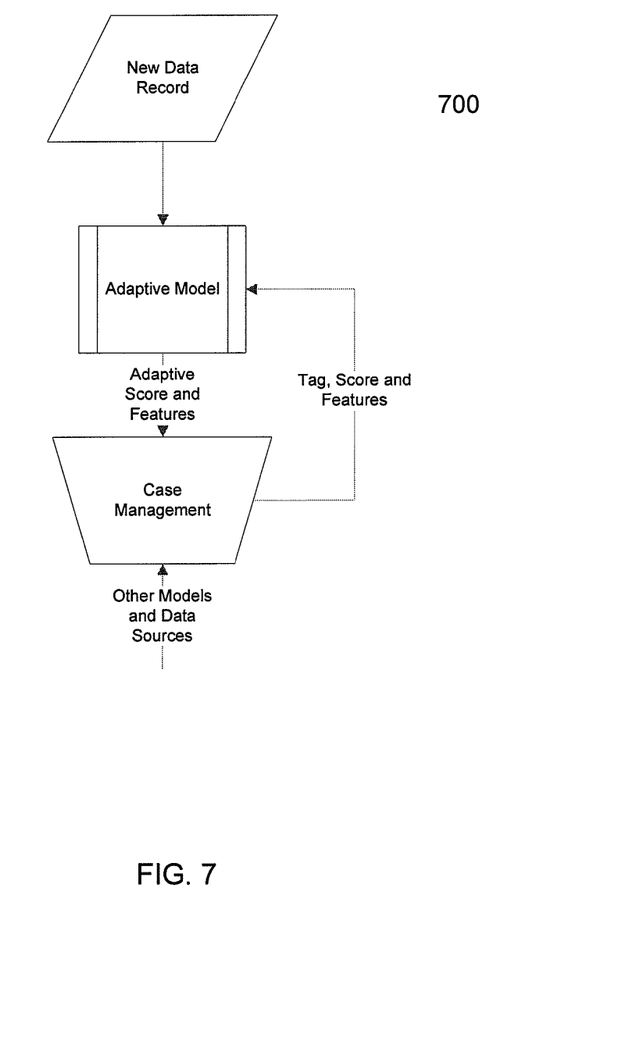
FIG. 7 shows a flow 700 of data records in an adaptive model only configuration.
Figure 8:
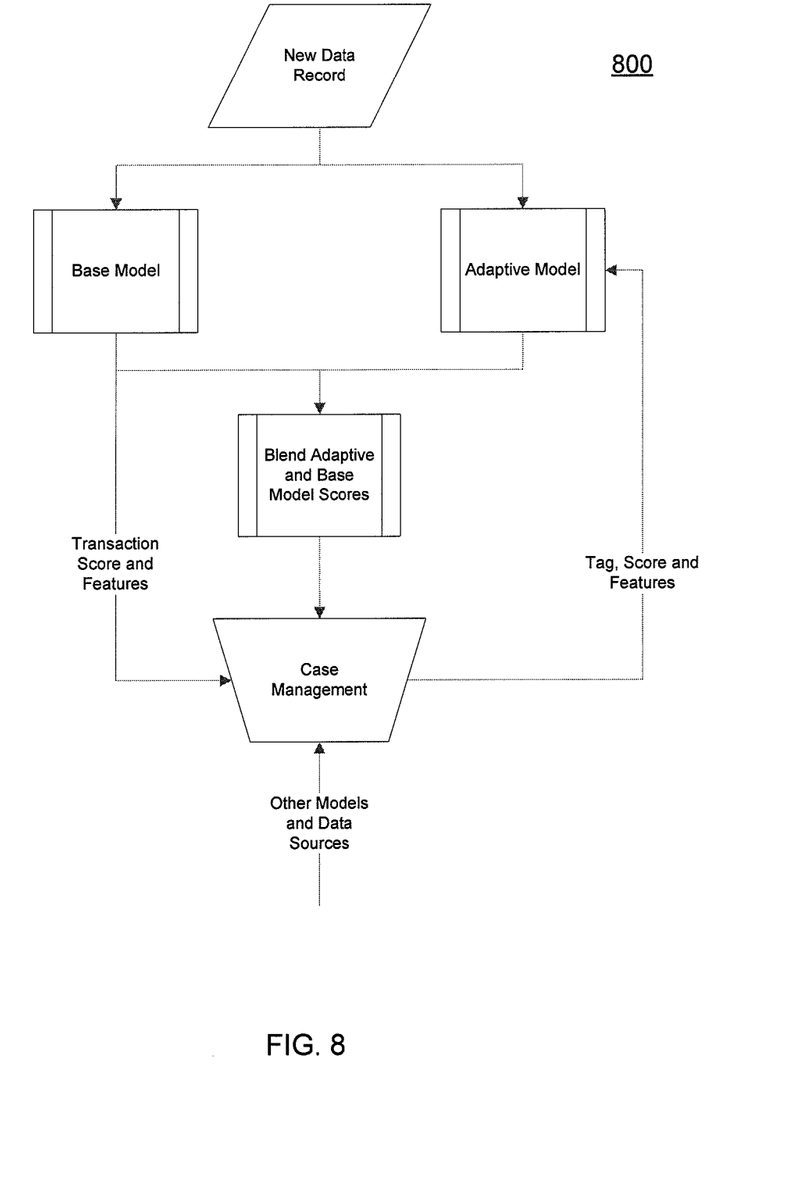
FIG. 8 shows a flow 800 of data records in parallel model configuration.

In addition to the cascade architecture, the adaptive model can be run by itself without a base model, as shown in FIG. 7, or in parallel with the base model, as shown in FIG. 8. The type of adaptive model need not be limited to PNN, NB or kNN. Linear regression, logistic regression, scorecards, or neural networks could also be used. However, the investigated methods do not require an iterative training process.

Variable binning may be replaced by parametric methods for describing probability distribution functions (PDF) or other non-parametric methods such as kernel density estimation. For the parametric methods, one would then estimate the parameters of the proposed distributions, and compute the probabilities on the right-hand side in Equations 3.1 and 3.2 using the estimated PDF, and for kernel methods one similarly would use the kernel density estimations. Besides scaling, other data preprocessing could include such techniques as Principle Component Analysis (PCA), Independent Component Analysis (ICA) or the creation of new features by combining and transforming the original input variables.

Different feature selection techniques can be used. One classification of such techniques includes the "filter" family of techniques. Filter variable selection does not require the model to be executed. The "wrapper" family of feature selection executes the model within a loop using various variable combinations to determine which set of variables yields the best model performance. Score blending could be accomplished through linear regression, logistic regression, neural networks, etc.

In one preferred exemplary implementation, steps such as binning and feature selection occur only one time when a sufficient number of records have been stored on the fraud and non-fraud queues. Binning and feature selection could be updated in a batch mode each time the queues are filled with new records. Also, the updates for binning and feature selection could occur in an online manner whenever a new record arrives.

When a fraud model is running in production, one sets a score threshold to select the records for which a case is generated and sent to analysts for review. The feature vector and any other necessary data are stored in a database. Once the analyst has determined whether the case is fraudulent, the corresponding record and associated fraud feature variables and the known fraud status are retrieved from the database and are fed back to the adaptive model. This feedback record is not scored by the adaptive model, but rather is used for inclusion into the fraud and non-fraud tables (FIFO queues) within the adaptive model.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method comprising:
receiving, by one or more programmable processors, a new data record;
generating, using a base model executed by the one or more programmable processors, a first score being a first likelihood of the new data record being associated with an undesirable event;
generating, when the first likelihood is more than a threshold and using an adaptive model executed by the one or more programmable processors, a second score to represent a second likelihood of the new data record being associated with the undesirable event, the adaptive model receiving feedback from one or more external data sources, the feedback comprising information about one or more previous data records associated with the base model generated by scoring parameters from at least one of the one or more external data sources, the feedback being used to update scoring parameters within the adaptive model that are used to generate the second score; and displaying, a blended score based on at least one of the first score and the second score in real-time, the blended score being applied to predict likelihood of occurrence of the undesirable event;

selecting one or more records associated with the undesirable event in response to a score threshold being reached;

generating a case for an analyst review based on the one or more selected records; and enhancing, by the one or more programmable processors, the adaptive model's performance by feeding corresponding records and associated fraud feature variables to the adaptive model in response to determining whether the case is fraudulent.

2. The computer-implemented method of claim 1, wherein the adaptive model receives the information about the one or more previous data records as input variables to update scoring parameters used to generate the second score for the new data record.

3. The computer-implemented method of claim 2, wherein each of the one or more external data sources stores the one or more previous data records in a first-in, first-out (FIFO) table.

4. The computer-implemented method of claim 3, wherein the adaptive model is based on a Naïve Bayesian model.

5. The computer-implemented method of claim 1, further comprising computing probabilities of the one or more previous data records being associated with the undesirable event.

6. The computer-implemented method of claim 5, further comprising:
   comparing the new data record with the one or more previous data records; and
   computing the second likelihood that the new data record is associated with the undesirable event based on the comparing.

7. The computer-implemented method of claim 6, further comprising combining the second likelihood with the probabilities of the one or more previous data records being associated with the undesirable event to calculate marginal probabilities of the new data record.

8. The computer-implemented method of claim 7, further comprising combining the marginal probabilities to compute the posterior probability of the new data record.

9. The computer-implemented method of claim 8, wherein the second score is based at least in part on the posterior probability.

10. A computer program product comprising machine-readable media having computer program code that is configured to instruct a programmable processor to:
   receive a new data record;
   generate, using a base model executed by a computer including the programmable processor, a first score for the new data record, the first score characterizing a first probability that the new data record is associated with an undesirable event;
   generate, when the first probability is more than a threshold and using an adaptive model that is cascaded with the base model and that is executed by the computer, a second score to represent a second probability that the new data record is associated with the undesirable event, the adaptive model employing feedback from one or more external data sources, the feedback containing information about one or more previous data records associated with the base model generated by scoring parameters from at least one of the one or more external data sources, the second score being blended with the first score to obtain a blended score; and applying at least one of the first score, the second score, and the blended score to predict likelihood of occurrence of the undesirable event;

select one or more records associated with the undesirable event in response to a score threshold being reached;

generate a case for an analyst review based on the one or more selected records; and enhance, by the programmable processor, the adaptive model's performance by feeding corresponding records and associated fraud feature variables to the adaptive model in response to determining whether the case is fraudulent.

11. The computer program product of claim 10, wherein the adaptive model receives the information about the one or more previous data records as input variables to update scoring parameters used to generate the second score for the new data record.

12. The computer program product of claim 11, wherein each of the one or more external data sources stores the one or more previous data records in a first-in, first-out (FIFO) table.

13. The computer program product of claim 12, wherein the adaptive model is based on a Naïve Bayesian model.

14. The computer program product of claim 10, wherein the computer program code is further configured to instruct the programmable processor to compute probabilities of the one or more previous data records being associated with the undesirable event.

15. The computer program product of claim 14, wherein the computer program code is further configured to instruct the programmable processor to:
   compare the new record with the one or more previous data records; and
   compute the second probability that the new data record is associated with the undesirable event based on the comparing.

16. The computer program product of claim 15, wherein the computer program code is further configured to instruct the programmable processor to combine the second probability with the probabilities of the one or more previous data records being associated with the undesirable event to calculate marginal probabilities of the new data record.

17. The computer program product of claim 16, wherein the computer program code is further configured to instruct the programmable processor to combine the marginal probabilities to compute the posterior probability of the new data record.

18. The computer program product of claim 17, wherein the second score is based at least in part on the posterior probability.

19. The computer program product of claim 10, wherein the computer program code is further configured to instruct the programmable processor to transmit the second score to another computer connected to the computer via a communication network.

20. A system comprising:
   at least one programmable processor; and
   a non-transitory machine-readable medium storing instructions that, when executed by the at least one programmable processor, cause the at least one programmable processor to perform operations comprising:

receiving a new data record;

generating, using a base model, a first score being a first likelihood of the new data record being associated with an undesirable event;

generating, when the first likelihood is more than a threshold and using an adaptive model executed by the one or more programmable processors, a second score to represent a second likelihood of the new data record being associated with the undesirable event, the adaptive model receiving feedback from one or more external data sources, the feedback comprising information about one or more previous data records associated with the base model generated by scoring parameters from at least one of the one or more external data sources, the feedback being used to update scoring parameters within the adaptive model that are used to generate the second score; and practically applying at least one of the first score, the second score, or a blend of the first score and the second score to indicate likelihood of occurrence of the undesirable event;

selecting one or more records associated with the undesirable event in response to a score threshold being reached;

generating a case for an analyst review based on the one or more selected records; and enhancing, by the at least one programmable processor, the adaptive model's performance by feeding corresponding records and associated fraud feature variables to the adaptive model in response to determining whether the case is fraudulent.

21. The system of claim 20, the one or more external data sources storing the one or more previous data records in a queue for various fraud types to identify one or more fraud types that are more likely.

22. The system of claim 21, where additional segmentation of fraud by identifying the various fraud types improves the base model's performance.

* * * * *